Nov. 29, 1955 W. H. HOWE 2,725,068
TRANSMITTING SINGLE OUTPUT SIGNAL
FROM PLURALITY OF INPUT SIGNALS
Filed June 25, 1951
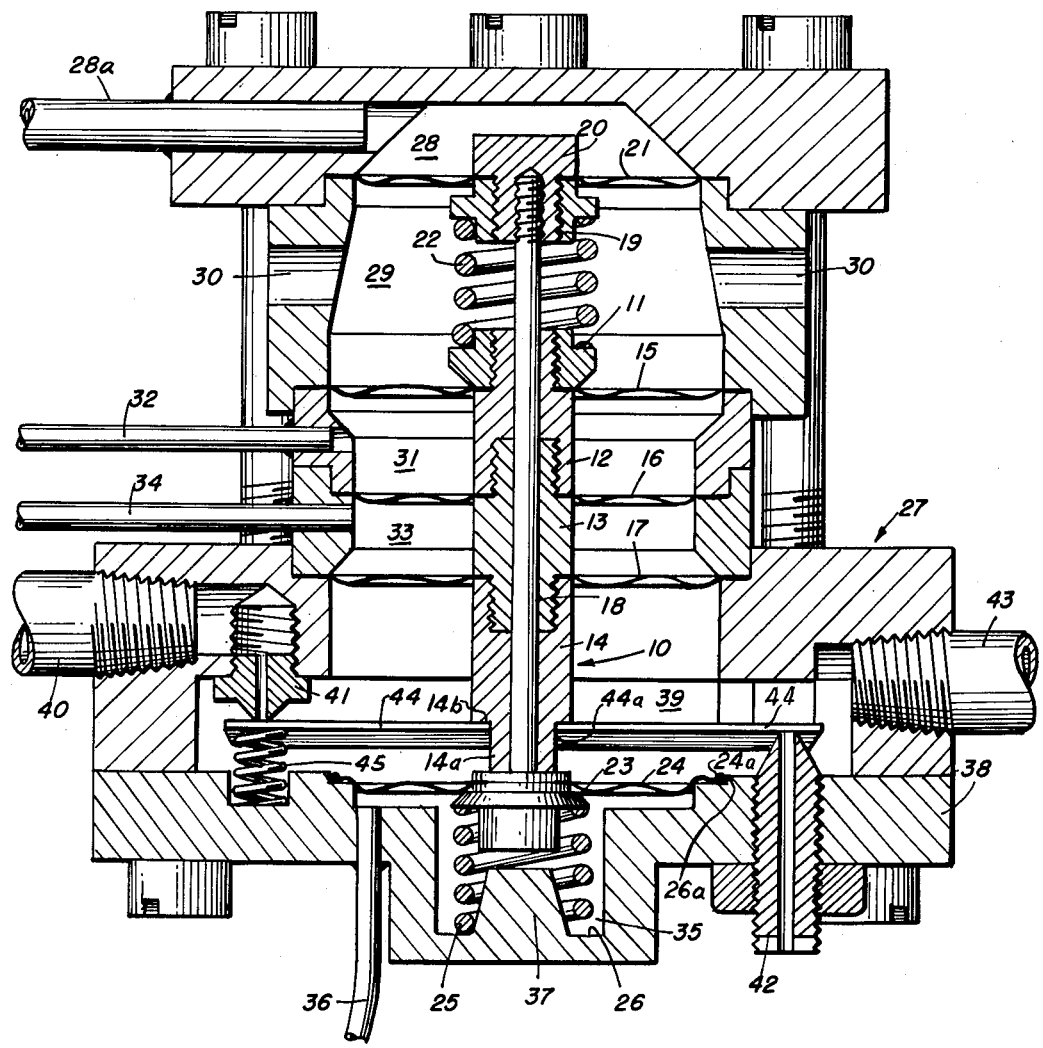
INVENTOR:
WILFRED H. HOWE
BY
ATT'YS

United States Patent Office 2,725,068
Patented Nov. 29, 1955

2,725,068

TRANSMITTING SINGLE OUTPUT SIGNAL FROM PLURALITY OF INPUT SIGNALS

Wilfred H. Howe, Foxboro, Mass., assignor to the United States of America as represented by the Secretary of the Navy Application June 25, 1951, Serial No. 233,463

10 Claims. (Cl. 137—82)

This invention relates to an apparatus for receiving a plurality of input pressure signals and for transmitting an output pressure signal based on the input signals. More specifically, it relates to an apparatus that opens and closes a source of pressure fluid and a drain therefor in order to control transmission of a pressure signal.

An object of the present invention is to provide an apparatus by which a plurality of input signals are combined to control the transmission of an output signal. By the apparatus one input signal may override another input signal so as to control the output signal.

Other objects and many of the attendant advantages of this invention will be readily appreciated as the same becomes better understood by reference to the following detailed description when considered in connection with the accompanying drawing.

The apparatus of the present invention has a sleeve 10 formed of a plurality of sections 11, 12, 13, and 14 threaded to one another so as to clamp diaphragms 15, 16, and 17 at their central openings. A stem 18 is mounted in the sleeve 10 and carries at its upper end threaded parts 19 and 20 which clamp a diaphragm 21 at its central opening. A spring 22 on the stem acts between the part 19 and the section 11 comprising the upper end of the sleeve 10 to urge the lower end of the sleeve against a member 23 on the lower end of the stem 18. The member 23 may be formed of two parts that clamp a diaphragm 24 at its central opening and secure it to the stem 18. The outer periphery of the diaphragm 24 is seated and secured by a fillet 24a in a shallow recess 26a in the top of a housing base 26 to make it of the same effective area as the opposite upper diaphragm 17. A coil spring 25 acts between the part 23 and the base 26 of a casing 27 to urge the stem 18 upwards.

The diaphragm 21 and the upper end of the casing 27 form a chamber 28 to which pressure fluid is supplied by a line 28a. The pressure fluid acts downwards against diaphragm 21 and may correspond to depth and rate of change of depth of a torpedo, for example.

Diaphragms 21 and 15 define a chamber 29 which is open at 30 to subject diaphragms 21 and 15 to ambient pressure. Diaphragm 15 has a larger area than diaphragm 21 so that the ambient pressure exerts a net downward force.

Diaphragms 15 and 16 and housing 27 form a chamber 31 which is subjected to pressure fluid through a line 32. Diaphragms 16 and 17 and housing 27 form a chamber 33 which is subjected to pressure fluid through a line 34. The difference in pressures applied to chambers 31 and 33 may, for example, be representative of the inclination of a torpedo. Diaphragms 15 and 17 are larger in area than diaphragm 16, and so the net force exerted by pressure fluid in chambers 31 and 33 is downward if the pressure in chamber 33 is greater than that in chamber 31. If the pressure in chamber 33 is less than that in chamber 31, the net force in chambers 31 and 33 is upward.

The diaphragm 24 and housing base 26 form a chamber 35 which is subject to pressure fluid through a line 36. The pressure of this fluid is a reference pressure acting upward against the diaphragm 24. Downward movement of the diaphragm 24 is limited by contact of member 23 with a projection 37 on the housing base 26 within the spring 25.

The diaphragms 17 and 24 together with an enlarged portion 38 of the housing 27 form a chamber 39 to which pressure fluid is supplied through a line 40 and a fitting 41 mounted in the housing portion 38. This housing portion carries a drain member 42 and a line 43 through which a pressure signal may be transmitted. The diaphragms 17 and 24 are of equal effective areas so that the pressure fluid in chamber 39 is without effect on the sleeve 10. A flapper valve 44 is pivoted as by a hole 44a between its ends which freely fits over a reduced end 14a and against a shoulder 14b formed thereby on the section 14 of the sleeve 10. The ends of the valve 44 can contact the fitting 41 from the bottom and the drain 42 from the top so as to control the supply and drain of the pressure fluid to and from the chamber 39. A spring 45 urges the valve 44 against the fitting 41. This structure is such that the flapper valve 44 uncovers the supply nozzle fitting 41 pivoting on the drain member 42 when the sleeve 14 moves toward the bottom of the device, and the valve 44 uncovers the drain member 42 pivoting on the fitting 41 when the sleeve rises above the neutral position. Thus, motion of the stem and sleeve assembly is translated into variation of the output signal pressure so that this pressure is a function of the sum of the input pressures.

Downward movement of the sleeve 10 causes the flapper valve 44 to close the drain 42 and open the fitting 41 so that pressure fluid is supplied by line 40 to chamber 39, and an output pressure signal is transmitted through line 43. Upward movement of the sleeve 10 causes the flapper valve to open the drain 42 and close the fitting 41 so that the supply of pressure fluid is cut off and fluid goes out through drain 42. Thus the pressure is reduced in chamber 39, and the output signal is no longer transmitted through line 43.

The sleeve 10 moves downward when the sum of the pressure force in chamber 28 and the net downward force of pressures in chambers 31 and 33 is sufficient to overcome the sum of the pressure force in chamber 35 and the force of spring 25. Thus the output signal in line 43 is determined by a plurality of input signals in chambers 28, 31, and 33. When the aforesaid sums are reversed in their relation, the sleeve 10 moves up. In some instances this will occur when the pressure relation of chambers 16 and 17 is reversed, i. e., the net force from chambers 16 and 17 is upward.

A significant feature of the apparatus of the present invention is that the sleeve 10 can move up, causing the drain 42 to be opened and the supply fitting 41 to be closed by the flapper valve 44 and the output signal in line 43 to cease, even though the downward force on diaphragm 21 might be greater than the net upward force on diaphragms 15, 16, and 17, and the force on diaphragm 24 from spring 25 and pressure in chamber 35. This is the case because the sleeve 10 can move upward with respect to the stem 18, the spring 22 yieldingly resisting such upward movement.

Thus, as applied to torpedo control, the attitude or inclination of the torpedo, which is reflected in the relation of the pressures in chambers 31 and 33, can open the drain 42 and close fitting 41 and interrupt the output signal in line 43, in spite of the fact that the depth and rate of change of depth of the torpedo, which is reflected by the pressure in chamber 28, might be such as to demand closing of drain 42 and opening of fitting 41 and an output signal in line 43.

Obviously the output signal in line 43 may be made dependent on reduction of pressure in chamber 39 rather than increase of pressure.

Obviously many modifications and variations of the present invention are possible in the light of the above teachings. It is therefore to be understood that within the scope of the appended claims the invention may be practiced otherwise than as specifically described.

I claim:

1. In combination, a housing, a sleeve movable in the housing, a plurality of pressure-responsive diaphragms secured to the sleeve and housing to form pressure chambers, a stem positioned in the sleeve for axial movement relative to said sleeve, two end pressure-responsive diaphragms secured to the stem, resilient means limiting the movement in one direction of the sleeve with respect to the stem, a stop limiting movement in the opposite direction of the sleeve with respect to the stem, a pressure chamber in the housing formed by the sleeve and stem diaphragms, a flapper valve in the last pressure chamber pivotally connected at a midpoint to the sleeve and movable thereby, and a source of pressure fluid for the last pressure chamber at one end of the valve and a drain for the pressure at the other end controlled by opposite movements of the stem.

2. In combination, a housing, a sleeve movable in the housing, a first pressure-responsive means secured to the sleeve, a stem mounted in the sleeve for axial movement relative to said sleeve, a second pressure-responsive means secured to the stem, a spring resisting the relative movement of the stem and sleeve in one direction, a stop limiting relative movement of the stem and sleeve in the opposite direction, a pressure chamber in the housing comprising pressure-responsive means secured to the sleeve and stem, and valve means in the chamber pivotally connected intermediate its ends to the sleeve and movable with the sleeve, a source of pressure fluid and a drain for the chamber, the source being closed and the drain opened by movement of the sleeve and the valve means in one direction of movement and operative in the opposite direction to open the said source and close the said drain.

3. In combination, a housing, a sleeve movable in the housing, a pressure-responsive means secured to said sleeve and housing to provide pressure operating chamber, a stem mounted in the sleeve for motion relative thereto in one direction, a first boss member projecting from one end of said stem providing a shoulder about said stem, a spring extending between said boss and one end of said sleeve for urging said sleeve in a direction opposite said one direction, a second boss on the opposite end of said stem providing a shoulder against which the end of said sleeve opposite said one end of said sleeve is urged by said spring to allow said stem and sleeve to move together in the direction urged by said spring, a pressure-responsive means secured to said stem, the stem and sleeve being movable in response to pressure variation of said pressure-responsive means connected thereto a pressure output chamber formed in the casing between pressure-responsive means secured to the stem and to the sleeve, a pressure source inlet and a drain outlet for the chamber, valve means coupled to said sleeve for actuation by movement of said sleeve to vary the pressure in said output chamber by opening the inlet or the outlet in an amount dependent on the degree and direction of movement of said sleeve.

4. In combination, a housing, a first pressure-responsive device in the housing, a second pressure-responsive device mounted in the first device and movable relative thereto, a spring resisting movement of the first device with respect to the second device in one direction, a stop limiting movement of the first device with respect to the second device in the opposite direction, a pressure chamber in the housing comprising the first and second pressure-responsive devices, and a valve in the chamber pivotally connected intermediate its ends to the first device and movable therewith, a source of fluid pressure and a drain therefor having oppositely extending openings engaged by the ends of the valve at opposite sides of the first device and controlled by movements thereof.

5. In combination, a housing, a first pressure-responsive device movable in the housing, a second pressure-responsive device mounted in the first device and movable relative thereto, differential pressure means tending to move the first and second devices a spring resisting movement of the first device with respect to the second device in one direction, a stop limiting movement of the first device with respect to the second device in the opposite direction, a pressure chamber in the housing comprising the first and second pressure-responsive devices, a valve in the chamber pivotally connected intermediate its ends to the first device and movable therewith, a source of pressure fluid and a drain for the chamber, the source being closed and the drain being opened by the valve by movement of the first device in one direction and the valve operative by movement of the first device in said opposite direction to open the said source and close the said drain.

6. In combination, a housing, a first pressure-responsive device movable in the housing, a second pressure-responsive device mounted in the first device and movable relative thereto, differential pressure means tending to move the first and second devices, a spring resisting movement of the first device with respect to the second device in one direction, a stop limiting movement of the first device with respect to the second device in the opposite direction, a pressure chamber in the housing comprising the first and second pressure-responsive devices, a valve in the chamber connected by a midpoint to the first device and movable therewith, a source of pressure fluid for the chamber at one end of the valve and a drain for the pressure fluid at the other end, the said source being engaged by one side of the valve and the drain being engaged by the other side at the opposite ends of the valve, movement of the first device in the said one direction being operative to move the valve to close the source of pressure fluid and open the drain therefor and by movement of the first device in said opposite direction to open the said source and close the said drain.

7. In combination, a housing, a first device movable in the housing in response to a first input signal, a second device movable in response to a second input signal and being mounted in and relatively movable to the first device, yielding means resisting movement of the first device in one direction with respect to the second device, a stop limiting movement of the first device with respect to the second device in the opposite direction, means forming a chamber in the housing having pressure means to transmit an output signal and separate pressure means to transmit an input signal, and valve means connected for movement in the chamber to the first device and upon movement of the first device in the said one direction to transmit an output signal and to stop transmitting an output signal upon movement of the first device in the said opposite direction.

8. In combination, a housing, a first device movable in the housing in response to a first input pressure signal, a second device movable in response to a second input pressure signal and being mounted in and movable relatively to the first device, means forming a pressure chamber around one end of the first device and including a part of the second device, a valve connected to the second device in the chamber for transmitting an output pressure signal, and means associating the device with one another for making the first device capable of movement in one direction with respect to the second device and incapable of movement in the oppositee direction with respect thereto, whereby the first input pressure signal can override the second input pressure signal to interrupt transmission of the output pressure signal.

9. In combination, a housing, a stem in said housing, a sleeve enveloping said stem in said housing and movable relative thereto, pressure responsive diaphragms connected to said stem and housing and defining with the walls of said housing and adjacent diaphragms coaxial chambers, said stem and sleeve movable in response to pressure variation in said chambers, a pressure output chamber in said housing, a pressure source inlet and a drain outlet for the output chamber, respective means partially external to said housing for applying pressure signals to said coaxial chambers, valve means for said inlet and outlet coupled to said sleeve movable in response to motion of said sleeve to vary the pressure in said output chamber by opening the inlet or outlet in accordance with the resultant force applied to said sleeve by the said pressure-responsive diaphragms, means coupled between said sleeve and stem for allowing relative motion therebetween in one direction of motion of said sleeve whereby the pressure in said output chamber may be independent of the motion of said stem and for coupling the motion of said sleeve and stem together where either stem or sleeve moves in the opposite direction.

10. The combination of claim 9 characterized further by the relative areas of some of the adjacent diaphragms being unequal to produce a desired balancing of input pressure signals to open the inlet and close the outlet when the sleeve is moved in a direction independent of that of the stem, and to close the inlet and open the outlet when the stem or sleeve moves in the opposite direction.

References Cited in the file of this patent

UNITED STATES PATENTS

| | | |
|---|---|---|
| 1,556,614 | Lane | Oct. 13, 1925 |
| 2,192,117 | Wile | Feb. 27, 1940 |
| 2,371,810 | Eaton | Mar. 20, 1945 |
| 2,517,051 | Swenson | Aug. 1, 1950 |
| 2,540,183 | Allen | Feb. 6, 1951 |
| 2,630,132 | Hughes | Mar. 3, 1953 |